(12) United States Patent
Skog et al.

(10) Patent No.: US 9,232,468 B2
(45) Date of Patent: Jan. 5, 2016

(54) DELIVERING A PLURALITY OF SIMULTANEOUS SESSIONS TO A CLIENT VIA A RADIO ACCESS NETWORK

(71) Applicant: Telefonaktiebolaget L M Ericsson (publ), Stockholm (SE)

(72) Inventors: Robert Skog, Hässelby (SE); Anders Axelsson, Sundbyberg (SE); Ann-Christine Eriksson, Grillby (SE); Johan Kölhi, Vaxholm (SE); Thorsten Lohmar, Aachen (DE); Dan Mathiasen, Nacka (SE); Mathias Sintorn, Sollentuna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 113 days.

(21) Appl. No.: 13/818,333

(22) PCT Filed: Jan. 29, 2013

(86) PCT No.: PCT/SE2013/050065
§ 371 (c)(1),
(2) Date: Feb. 22, 2013

(87) PCT Pub. No.: WO2014/120052
PCT Pub. Date: Aug. 7, 2014

(65) Prior Publication Data
US 2014/0211675 A1      Jul. 31, 2014

(51) Int. Cl.
*H04W 52/02*      (2009.01)
*H04L 5/00*       (2006.01)
*H04W 28/02*      (2009.01)
*H04W 72/12*      (2009.01)

(52) U.S. Cl.
CPC ......... *H04W 52/0209* (2013.01); *H04L 5/0058* (2013.01); *H04W 28/0221* (2013.01); *H04W 72/1242* (2013.01)

(58) Field of Classification Search
None
See application file for complete search history.

(56) References Cited

U.S. PATENT DOCUMENTS

| | | | | |
|---|---|---|---|---|
| 8,457,639 | B2 * | 6/2013 | Gazzard | 455/437 |
| 2011/0122783 | A1 * | 5/2011 | Lin et al. | 370/252 |
| 2012/0327779 | A1 * | 12/2012 | Gell et al. | 370/238 |
| 2014/0098694 | A1 * | 4/2014 | Damji et al. | 370/252 |
| 2014/0112221 | A1 * | 4/2014 | Verger et al. | 370/311 |

* cited by examiner

*Primary Examiner* — Brian D Nguyen
*Assistant Examiner* — Hashim Bhatti
(74) *Attorney, Agent, or Firm* — Murphy, Bilak & Homiller, PLLC

(57) ABSTRACT

A method (300) of a network node for delivering a plurality of simultaneous sessions to a client via a Radio Access Network (RAN) is provided. The method comprises identifying (301) a streaming session, reshaping (302) the streaming session into a sequence of bursts and silent periods, identifying (303) at least one non-time-critical session, reshaping (304) the at least one non-time-critical session into respective sequences of bursts and silent periods, and transmitting (305) the sequences of bursts and silent periods to the RAN. The reshaping (304) of the non-time-critical sessions is performed such that bursts, or silent periods, or both, of the at least one non-time-critical session are aligned with bursts, silent periods, or both, respectively, of the streaming session. By timely aligning the respective bursts and silent periods with each other, the duration of common silent periods may be increased, thereby utilizing air interface resources more efficiently. In addition, a method of a client for receiving a plurality of simultaneous sessions via a RAN is provided.

12 Claims, 5 Drawing Sheets

US 9,232,468 B2

DELIVERING A PLURALITY OF SIMULTANEOUS SESSIONS TO A CLIENT VIA A RADIO ACCESS NETWORK

TECHNICAL FIELD

The invention relates to a method of a network node for delivering a plurality of simultaneous sessions to a client via a Radio Access Network (RAN) and a corresponding network node. The invention relates further to a method of a client for receiving a plurality of simultaneous sessions via a RAN, a corresponding computer program, a corresponding computer program product, and a corresponding client.

BACKGROUND

Streamed media, such as video, is typically delivered from a source, e.g., a media server, to a client as a substantially continuous stream of data at a substantially constant bitrate, the media bitrate. If the media stream is delivered via a RAN, i.e., the client is a User Equipment (UE), this may result in an inefficient utilization of the air interface since radio resources which are allocated to the UE have to support link bitrates exceeding the media bitrate.

According to the $3^{rd}$ Generation partnership Project (3GPP), a number of communication states are defined, also referred to as Radio Resource Control (RRC) states, in which the UE may reside. In general, communication states which provide the UE with a higher bitrate are more resource consuming, and vice versa. In addition to an inefficient utilization of the air interface, the described approach has a negative impact on UE battery lifetime. In the Universal Mobile Telecommunications System (UMTS), e.g., the states in RRC connected mode are, in order of decreasing resource consumption, CELL_DCH (Dedicated Channel), CELL_FACH (Forward Access Channel), CELL_PCH (Cell Paging Channel) and URA_PCH (URA Paging Channel).

In order to utilize air interface resource more efficiently and to reduce power consumption on the UE side, streamed media may be reshaped into sequences of bursts and silent periods, such that bursts of data are transmitted to the client at a bitrate which is substantially larger than the media bitrate, and preferably utilizing the supported link bitrate to as large extent as possible, alternated with silent periods during which a transition of the UE to a less resource consuming communication state may be performed. The reshaping may be performed by the media server providing the media stream, a proxy, a node of the RAN, or any other network node involved in delivering streaming sessions to the RAN.

The transition from a higher communication state, e.g., CELL_DCH, to less resource consuming communication states, e.g., CELL_FACH or CELL_PCH, is effected by a control node of the RAN and is triggered by inactivity timers which are configured by the operator, with a typical duration of about a few second to ten seconds. The control node of the RAN may, e.g., be a Radio Network Controller (RNC), an eNodeB, or the like.

In order to further increase radio efficiency and reduce UE power consumption, it has been proposed to provide the control node of the RAN with information pertaining to a pattern of bursts and silent periods transmitted to the RAN, so as to enable switching to a less resource consuming communication state immediately after transmission of a burst has terminated, instead of waiting for an inactivity timer to expire. This may be achieved by providing the control node with information about a burst pattern to be transmitted to the RAN. Alternatively, the control node may be provided with an end-of-burst (EoB) indication, in response to which a transition to a less resource consuming communication state may be initiated.

However, the usefulness of reshaping media streams into bursts, and providing the control node of the RAN with information about a burst pattern to be transmitted or an EoB indication, is limited by the fact that modern UEs, such as smartphones, typically maintain several communication sessions in parallel, i.e., simultaneously. These sessions may, e.g., be associated with different applications which are executed in parallel, such as an email application, a video player, a chat application, and the like. In this case, the UE may be prevented from switching to a less resource consuming communication state during a silent period of the media stream, requested by the video player, because another application is receiving data at the same time, e.g., if the email application is syncing with a server.

SUMMARY

It is an object of the present invention to provide an improved alternative to the above techniques and prior art.

More specifically, it is an object of the present invention to provide an improved delivery of a plurality of simultaneous sessions to a client of a RAN. It is a further object of the invention to provide a delivery of a plurality of simultaneous sessions to a client of a RAN which utilizes the air interface more efficiently and reduces UE power consumption.

These and other objects of the invention are achieved by means of different aspects of the invention, as defined by the independent claims. Embodiments of the invention are characterized by the dependent claims.

For the purpose of elucidating the invention, a session is understood to be a communication session between a client and a server, established for the purpose of exchanging data between the client and the server, or vice versa. Communication related to such a session may commence in accordance with any suitable protocol, or a combination of such protocols, such as Transmission Control Protocol (TCP), Hyper-Text Transfer Protocol (HTTP), or the like. The expressions 'delivering a session' and 'receiving a session' are understood to embrace transmitting and receiving data related to the session.

According to a first aspect of the invention, a method of a network node is provided, for delivering a plurality of simultaneous sessions to a client. The simultaneous sessions are delivered to the client via a RAN. The method comprises identifying a streaming session among the plurality of simultaneous sessions, reshaping the streaming session into a sequence of bursts and silent periods, identifying at least one non-time-critical session among the plurality of simultaneous sessions, reshaping the at least one non-time-critical session into respective sequences of bursts and silent periods, and transmitting the sequences of bursts and silent periods to the RAN. The reshaping of the at least one non-time-critical session is performed such that bursts, or silent periods, or both, of the at least one non-time-critical session are aligned with bursts, silent periods, or both, respectively, of the streaming session.

According to a second aspect of the invention, a network node for delivering a plurality of simultaneous sessions to a client is provided. The simultaneous sessions are delivered via a RAN. The network node is arranged for identifying a streaming session among the plurality of simultaneous sessions, reshaping the streaming session into a sequence of bursts and silent periods, identifying at least one non-time-critical session among the plurality of simultaneous sessions, reshaping the at least one non-time-critical session into respective sequences of bursts and silent periods, and transmitting the sequences of bursts and silent periods to the RAN. The network node is arranged for reshaping the at least one non-time-critical session such that bursts, or silent periods, or both, of the at least one non-time-critical session are aligned with bursts, silent periods, or both, respectively, of the streaming session.

According to a third aspect of the invention, a method of a client for receiving a plurality of simultaneous sessions is provided. The simultaneous sessions are received via a RAN. The method comprises determining a time-criticalness for each of the plurality of simultaneous sessions, and transmitting a request to a server with which the client has established the session. The request is related to one of the plurality of simultaneous sessions. The request comprises an indication pertaining to the time-criticalness of the session.

According to a fourth aspect of the invention, a computer program is provided. The computer program comprises computer program code. The computer program code is adapted, if executed on a processor, to implement an embodiment of the method according to the third aspect of the invention.

According to a fifth aspect of the invention, a computer program product is provided. The computer program product comprises a computer readable storage medium. The computer readable storage medium has the computer program according to the fourth aspect of the invention embodied therein.

According to a sixth aspect of the invention, a client for receiving a plurality of simultaneous sessions is provided. The simultaneous sessions are received via a RAN. The client is arranged for determining a time-criticalness for each of the plurality of simultaneous sessions, and transmitting a request to a server with which the client has established the session. The request is related to one of the plurality of simultaneous sessions. The request comprises an indication pertaining to the time-criticalness of the session.

The present invention makes use of an understanding that the delivery of multiple simultaneous sessions to the same client of a RAN may be improved by reshaping the sessions into sequences of bursts and silent periods, and synchronizing the respective sequences of bursts and silent periods, one sequence for each session, with each other. The client may, e.g., be a UE, a computer, a tablet, a mobile phone, a smartphone, a media player, or any device capable of effecting wireless communications via a RAN. In the present context, simultaneous sessions are sessions are communication sessions established by, or with, the same client. These sessions may be identified based on the client address in requests sent from the client to a server, or responses transmitted from a server to the client.

To this end, a streaming session is identified among the simultaneous sessions and is reshaped into a sequence of bursts and silent periods. Typically, a streaming session is characterized by a substantially continuous flow of data having a substantially constant bitrate. In order to achieve a more efficient utilization of the RAN's air interface, and to reduce UE power consumption, the streaming session is reshaped into bursts and silent periods such that relatively short bursts of data are transmitted with an increased bitrate, with silent periods of no transmission inbetween subsequent bursts. The duration of bursts and silent periods, and the bitrate of bursts, is adjusted such that the average bitrate is substantially equal to the bitrate of the stream, i.e., the media bitrate. Preferably, the bitrate during bursts is adjusted such that the supported link bitrate of a radio link between the client and an access node of the RAN is utilized to as large extent as possible. In this way, the client, i.e., the UE receiving the session, may switch to less resource consuming communication states during the silent periods. Optionally, the access node of the RAN may acquire an End-of-Burst (EoB) indication, or other information pertaining to a pattern of bursts and silent periods, so as to enable the access node to initiate a transition of the UE to less resource consuming communication states immediately after transmission of a burst has terminated, rather than in response to an expired inactivity timer.

However, such an approach is hampered by the fact the modern UEs, such as smartphones, tablet computers, and the like, are capable of executing several applications simultaneously, resulting in establishment of a plurality of simultaneous communication sessions. For instance, a user of a smartphone may watch a video which is streamed to a video player application, while an email application running in the background synchronizes with an email server, and a chat application receives a message. In such a scenario, delivery of the streaming session cannot be improved, i.e., be made more radio friendly, by reshaping the stream of data into bursts and silent periods since one or more simultaneous sessions may delivery data to the UE during silent periods of the streaming session, thereby preventing the UE from switching to less resource consuming communication states.

The approach proposed here is based on an understanding that the delivery of multiple simultaneous sessions to the same client, i.e., to the same UE of a RAN, can be improved by reshaping the simultaneous sessions into sequences of bursts and silent periods such that the respective bursts, silent periods, or both, are timely aligned with each other. Preferably, alignment if performed so as to maximize the duration of common silent periods, which is equal to the shortest of several overlapped silent periods. In other words, a common silent period is a period during which no transmission occurs for any of the simultaneous sessions.

The streaming session among the simultaneous sessions may be used as reference with which the other sessions are aligned, since streaming sessions are time-critical whereas sessions carrying other types of traffic, such as email, web browsing, chat, and so forth, may be considered as non-time-critical, or at least less time-critical than streaming sessions. For these sessions small delays are acceptable, and data transmitted to the client may therefore be delayed so as to achieve sync with the streaming session.

It will be appreciated that embodiments of the invention are not limited to streaming sessions, and one may easily envisage embodiments of the invention for delivering simultaneous time-critical and non-time-critical sessions, the time-critical session or sessions being of a traffic type other than streaming. Further, a session may already be a sequence of bursts and silent periods. In this case, reshaping the session is understood to embrace reshaping a received sequence of bursts and silent periods into a different sequence of bursts and silence periods, e.g., by combining two or more bursts into one bursts, by splitting one burst into two or more bursts, by delaying bursts, by adjusting the bitrate of a burst, by delaying a bursts, and so forth.

An embodiment of the first or second aspect of the invention may, e.g., be implemented in a proxy being adapted for reshaping media streams which are delivered from one or more sources, such as media servers, to a RAN. Alternatively, embodiments of the invention may be implemented in any network node suitable for routing or processing data related to communication sessions which are established between a client of a RAN and one or more sources, such as media servers, email servers, web servers, or the like. For instance, the network node in accordance with embodiments of the invention may be a node of the RAN, such as a NodeB, and eNodeB, or an RNC.

According to an embodiment of the invention, reshaping the at least one non-time-critical session comprises aligning the onset of silent periods of the at least one non-time-critical session with the onset of silent periods of the streaming session. To this end, the non-time-critical sessions are reshaped into bursts and silent periods such that the onset of silent periods of a non-time-critical session coincides with the onset of silent periods of the streaming session. This is one way of maximizing the duration of common silent periods.

According to an embodiment of the invention, an indication pertaining to an onset of a common silent period is transmitted to the RAN. For instance, an EoB indication, a signal or a message, may be sent to the RAN. An access node of the RAN may use such indication to initiate a transition of the UE receiving the simultaneous sessions to a less resource consuming communication state. As an alternative, information pertaining to a pattern of bursts and silent periods may be sent to the RAN, e.g., information indicating the duration of a number of bursts and silent periods which are to be transmitted to the RAN. Such information may be used by the RAN to determine the onset of a common silent period.

According to an embodiment of the invention, the streaming session and the at least one non-time-critical session are identified based on a respective type of traffic carried by the sessions. For the purpose of reshaping the sessions into sequences of bursts and silent periods, and the sequences with each other, knowledge about the time-criticalness of each session is desirable. To this end, a type of traffic carried by each of the simultaneous sessions is determined, i.e., whether a session is a streaming session or carries traffic which is considered non-time-critical.

According to an embodiment of the invention, the streaming session and the at least one non-time-critical session are identified based on an address of one or more servers to which requests of the client are sent, and/or from which responses are received. Thus, requests sent from the client to a server with which a session is established are inspected and an address of the server is determined. The address of the server may, e.g., be an Internet Protocol (IP) address and, optionally, a port number, or a Uniform Resource Identifier (URI). Based on the determined address, streaming sessions and non-time-critical sessions are identified. This may, e.g., be accomplished using one or more lists comprising server addresses and corresponding information pertaining to the type of traffic, or time-criticalness, of one or more services provided by the servers. Such lists may be administered by an operator of a network, e.g., the RAN, a service provider, or any third party. It will also be appreciated that such lists may be compiled by inspecting traffic originating from servers providing services to clients, determining a type of traffic or time-criticalness related to such servers or services, and adding such information to one or more lists. Optionally or alternatively, streaming sessions and non-time-critical sessions may be identified by inspecting responses transmitted from a server to the client, in a similar manner as was described hereinbefore with regard to requests. The requests and responses transmitted may be HTTP requests and HTTP responses, respectively.

According to an embodiment of the invention, the streaming session and the at least one non-time-critical session are identified based on an indication received from the client. The indication pertains to the time-criticalness of the session. To this end, instead of identifying a traffic type or time-criticalness for each of the simultaneous sessions, such information may be acquired from the client. For instance, the client may, in each request sent to a server with which a session is established, provide information pertaining to a type of traffic or time-criticalness of the session to which the request relates. For instance, such an indication may be comprised in the header of an HTTP request. As an alternative, the client may provide an indication as to the focus of the application to which the request relates. For instance, if a video player application has focus, it may be assumed that a user is actively watching a video clip, and that the corresponding session is time-critical and should not be delayed.

Even though advantages of the present invention have in some cases been described with reference to embodiments of the method according to the first aspect of the present invention, corresponding reasoning applies to embodiments of the network node according to the second aspect of the invention, embodiments of the method according to the third aspect of the invention, embodiments of the computer program according to the fourth aspect of the invention, embodiments of the computer program product according to the fifth aspect of the invention, and embodiments of the client according to the sixth aspect of the invention.

Further objectives of, features of, and advantages with, the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

Figure 1:
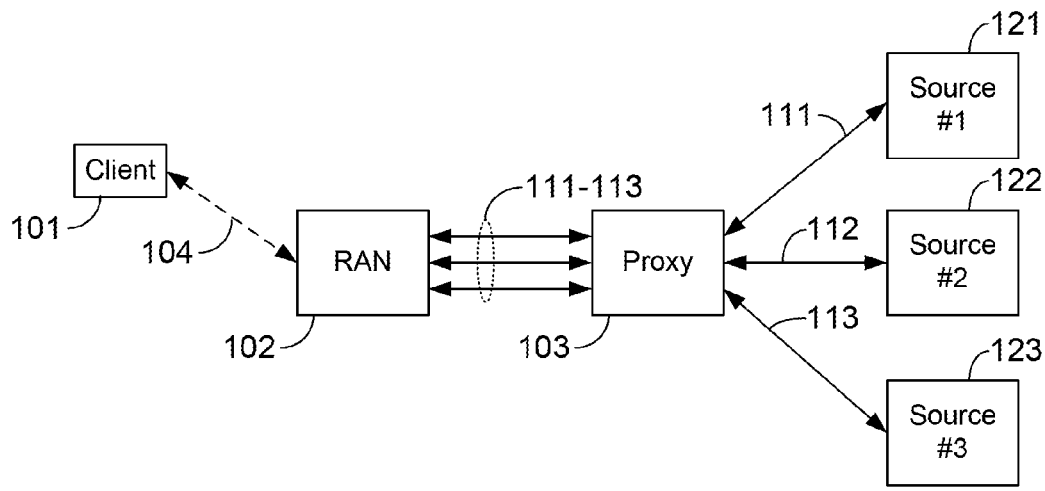
FIG. 1 schematically illustrates the delivery of simultaneous communication sessions to a client via a RAN, in accordance with an embodiment of the invention.

In FIG. 1, the delivery of a plurality of simultaneous communication sessions to a client via a RAN is illustrated.

Client 101 is capable of establishing multiple communication sessions 111-113 with one or more servers 121-123, e.g., media servers, email servers, web servers, or any server providing a service for access by clients via a communications network. Client 101 may, e.g., be a UE, such as a smartphone, a tablet computer, a media player, or the like, communicating with servers 121-123 via a RAN 102. Client 101 accesses RAN 102 by means of one or more radio links 104, in accordance with any suitable radio technology such as GSM, UMTS, or the like. In FIG. 1, sessions 111-113 established between client 101 and servers 121-123 are routed via a proxy 103 which is arranged for synchronizing simultaneous sessions 111-113, in accordance with an embodiment of the invention, as is described further below.

Figure 2:
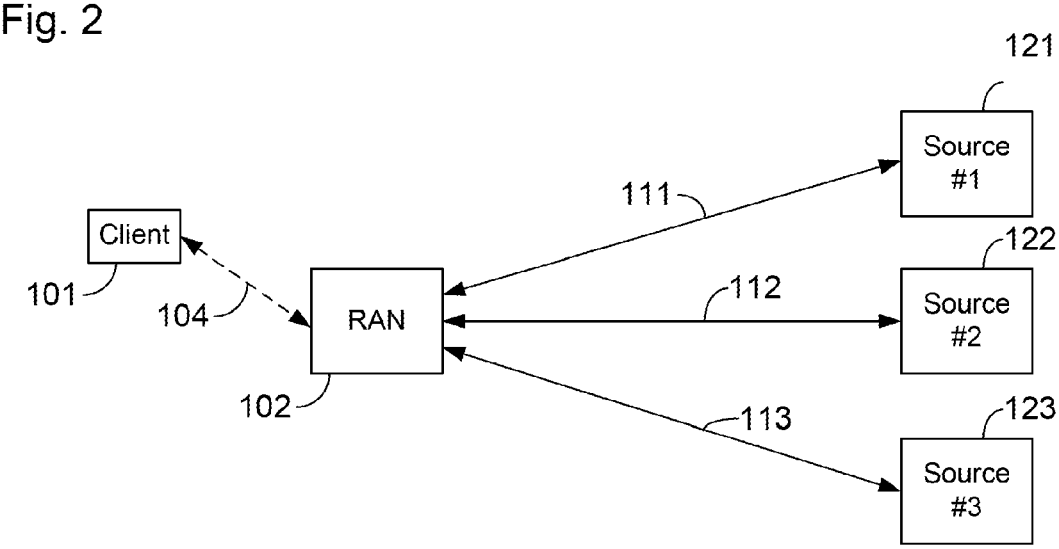
FIG. 2 schematically illustrates the delivery of simultaneous communication sessions to a client via a RAN, in accordance with another embodiment of the invention.

With reference to FIG. 2, an alternative embodiment of the invention is described. In contrast to FIG. 1, sessions 111-113 are not routed via a proxy, such as proxy 103 in FIG. 1, where they are synchronized. Rather, sessions 111-113 are synchronized by a node of RAN 102, such as a NodeB, an eNodeB, an RNC, or the like, or any node of a communications network through which sessions 111-113 are routed from servers 121-123 to RAN 102.

In the following, an embodiment of the first aspect of the invention is described with reference to FIG. 3.

An embodiment of the method of a network node for delivering a plurality of simultaneous sessions to a client via a RAN may be implemented in a proxy, a node of the RAN, or a node of a communications network (not shown in FIGS. 1 and 2) involved in routing the plurality of sessions from one or more servers to the RAN. The plurality of simultaneous sessions, i.e., the sessions established between the client and the one or more servers, may be identified by inspecting data packets transmitted form the client to the one or more servers, or vice versa. To this end, packets having a source or destination address, respectively, matching the address of the client are considered as belonging to the plurality of simultaneous sessions. Such simultaneous sessions are typically conveyed with the same Packet Data Protocol (PDP) context.

Figure 3:
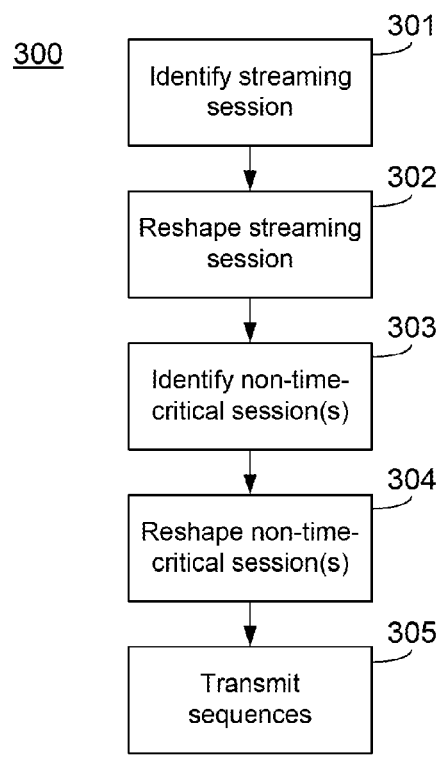
FIG. 3 shows a method of a network node, in accordance with an embodiment of the invention.

Further with reference to FIG. 3, method 300 starts with identifying a streaming session 301 among the simultaneous sessions. This may be achieved in different ways. For instance, the streaming session may be identified by determining a type of traffic for each of the simultaneous sessions, e.g., by observing traffic characteristics. As an alternative, the streaming session may be identified based on an address of the server with which the streaming session is established, e.g., a media server. To this end, data packets transmitted to, and/or received from, the server are inspected and the address of the server is determined. The server address is then compared to a list comprising server addresses and, for each listed server, information pertaining to services provided by the server, such as the type or types of traffic related to the provided services or the time-criticalness of the related traffic. Thus, by looking-up the server address, the type of session may be determined, i.e., whether the session is a streaming session or not. As yet a further alternative, the streaming session may be identified based on an indication received from the client, the indication pertaining to the time-criticalness or type of the session, as is described further below with reference to FIGS. 7 to 9.

Then, in step 302, the streaming session is reshaped into a sequence of bursts and silent periods, for the purpose of utilizing air interface resources more efficiently, in addition to reducing battery consumption on the client side. Preferably, the resulting bursts have a bitrate which is substantially larger than the media bitrate of the stream, and are adjusted such that the link bitrate supported by the RAN is utilized to as large extent as possible. The bursts are followed by silent periods during which no data is transmitted to the client, allowing the client to switch to a less resource consuming communication state. As an example, the client may reside in CELL_DCH during transmission of a burst, and a transition to CELL_FACH or CELL_PCH is performed after transmission of the burst has terminated, either triggered by an expiring inactivity time or in response to an EoB indication.

Since streaming sessions carry time-critical traffic, typically delivering a video sequence to the client for rendering, the sequence of bursts and silent periods obtained from reshaping the streaming session is used as a reference to which the other sessions of the plurality of simultaneous sessions are aligned, as is described further below. It will be appreciated that embodiments of the invention are not limited to streaming sessions, and one may easily envisage embodiments of the invention for sessions carrying time-critical traffic other than streamed media.

Subsequently, in step 303 at least one non-time-critical session is identified among the plurality of simultaneous sessions. This may be achieved in accordance with what is described hereinbefore in relation to step 301, i.e., identifying a streaming session.

In step 304, the identified non-time-critical sessions are reshaped into sequences of bursts and silent periods, one sequence for each of the non-time-critical sessions, similar to what is described in relation to step 302, i.e., reshaping the streaming session into a sequence of bursts and silent periods. However, the resulting bursts and/or silent periods, or both, of the non-time-critical sessions are aligned in time with the bursts and/or silent periods of the sequence of bursts and silent periods created in step 302, i.e., by reshaping the streaming session. In other words, the non-time-critical sequences of bursts and silent periods are distributed in time using the streaming session sequence of bursts and silent periods as reference.

The alignment of bursts, silent periods, or both, in time may be performed in different ways. Preferably, synchronization is performed so as to improve the utilization of air interface resources which are allocated by the RAN for the purpose of delivering the plurality of simultaneous sessions to the client, and to reduce power consumption on the client side. One way of accomplishing this is to maximize the duration of common silent periods, i.e., the duration of time during which no data is transmitted to the client. It will be appreciated that common silent periods are the result of timely aligning the respective sequences such that the duration of overlap of the respective silent periods is maximized. Further, it is preferable to adjust the bitrate of bursts such that the bitrate or bitrates supported by a radio link or radio links allocated by the RAN are utilized to as large extent as possible.

In accordance with an embodiment of the invention, reshaping the at least one non-time-critical session comprises aligning the onset of silent periods of the at least one non-time-critical session with the onset of silent periods of the streaming session. In this way, the duration of common silent periods is maximized. Optionally, an EoB indication, such as a signal or message, may be sent to the RAN for indicating the onset of a common silent period. In response to receiving such indication, the RAN may effect a transition of the client to a less resource consuming communication state, thereby freeing radio resources which may be allocated to other UEs, and prolonging the client's battery lifetime.

Finally, the resulting sequences of bursts and silent periods are transmitted 305 to the RAN. It will be appreciated that, since no data is actually transmitted during silent periods, this expression is to be understood such that the distribution of bursts and silent periods in time is preserved when transmitting the reshaped and synchronized sessions to the RAN.

In order to further elucidate the invention, the process of synchronizing the simultaneous sessions is exemplified in the following with reference to FIGS. 4 and 5.

Figure 4:
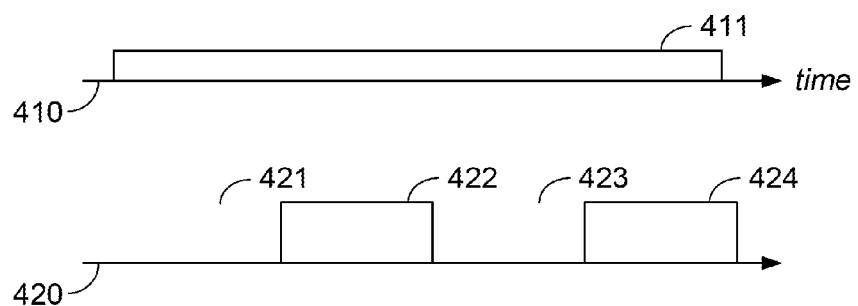
FIG. 4 illustrates reshaping a streaming session into a sequence of bursts and silent periods, in accordance with an embodiment of the invention.

In FIG. 4, reshaping sessions into sequences of bursts and silent periods is illustrated. For instance, one may consider a streaming session 410 which typically comprises a substantially continuous flow of data at a substantially constant bitrate. In practice, a media segment 411 of fixed duration, typically five or ten seconds, is transmitted to the client. In accordance with an embodiment of the invention, segment 411 is reshaped into a sequence 420 of bursts 422 and 424, and silent periods 421 and 423. The amount of data conveyed by bursts 422 and 424 together is equal to the amount of data contained in segment 411, but the duration of time during which the data is transmitted via the RAN to the client is decreased, while the bitrate during transmission of bursts 422 and 424 is larger than that of segment 411. In this case, reshaped sequence 420 starts with a silent period 421 since a sufficient amount of data carried in media segment 411 has to be buffered before burst 422 can be transmitted. One may also envisage scenarios in which sessions delivered to the client already are sequences of bursts and silent periods, but are reshaped in accordance with embodiments of the invention in order to utilize air interface resources more efficiently and to decrease client power consumption.

Figure 5:
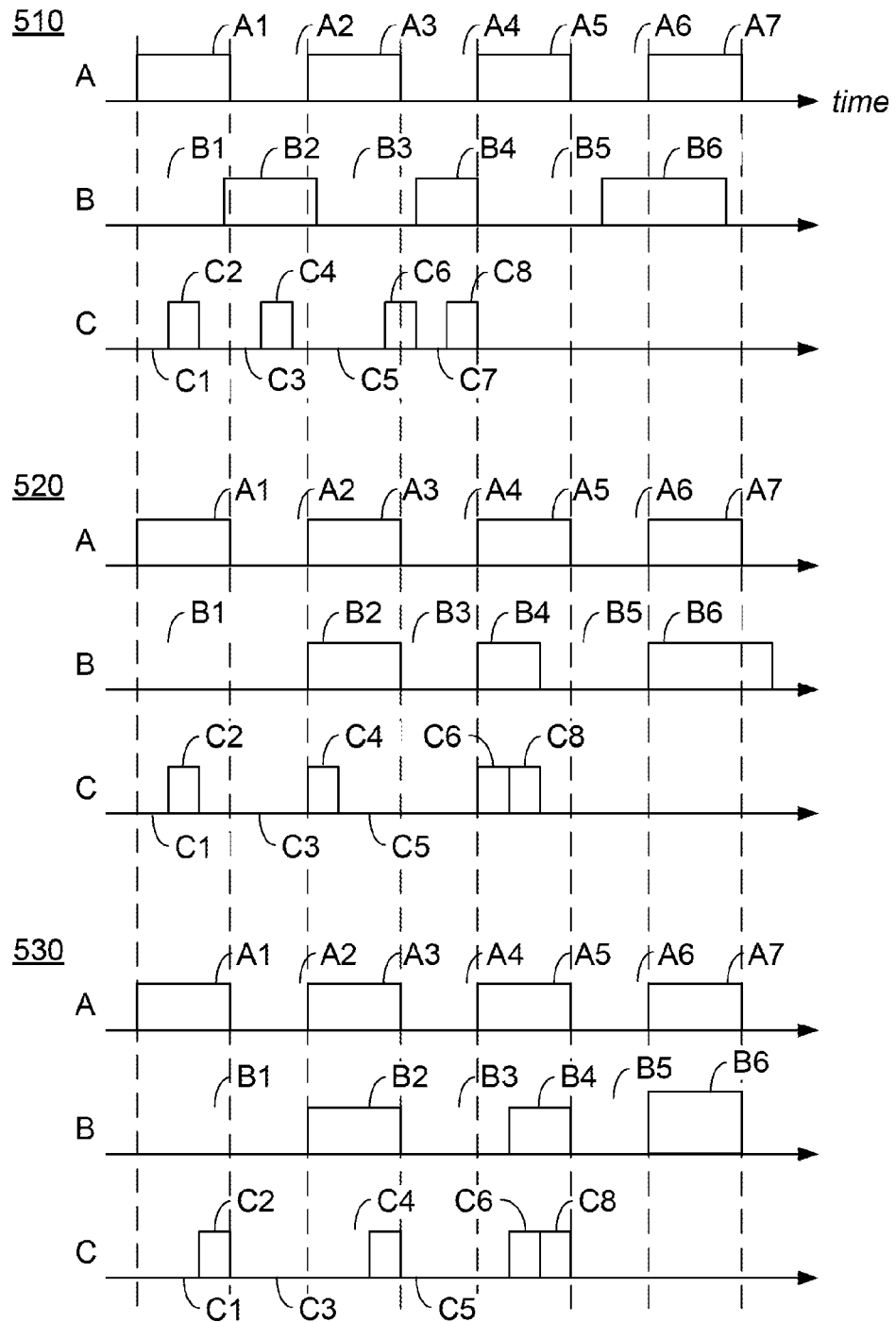
FIG. 5 illustrates synchronizing simultaneous sequences of bursts and silent periods, in accordance with an embodiment of the invention.

In FIG. 5, the process of synchronizing multiple sequences of bursts and silent periods is illustrated.

By way of example, three sessions A, B, and C, 510 are shown in FIG. 5. For the purpose of illustrating the process of timely aligning these sessions, it is assumed here that session A is a streaming session, or a session carrying any other type of time-critical traffic. In order to simplify FIG. 5, it is further assumed that sessions A, B, and C, have already been reshaped into respective sequences of bursts and silent periods.

Further with reference to FIG. 5, sessions B and C are reshaped so as to align their respective bursts and/or silent periods with session A. For instance, reshaped sessions 520 are synchronized with each other such that bursts are aligned in time with respect to their onset. It can further be seen that bursts C6 and C8 of session C 520 are combined into one burst and that burst C2 has not been shifted in time since it is much shorter than burst A1 and does not extend beyond the latter.

A second alternative for synchronizing sessions 510 is sessions 530, also shown in FIG. 5. In this case, bursts and silent periods are aligned with respect to their endings. Further, burst B6 of session B has been reshaped by adjusting the burst's duration to be equal to that of burst A7 of session A, while at the same time adjusting its bitrate correspondingly so as to preserve the amount of data contained in burst B6.

It will be appreciated that embodiments of the invention are not limited to the examples described with reference to FIG. 5, and embodiments of the invention based on other ways of synchronizing multiple simultaneous sessions delivered to a client via a RAN may easily be envisaged.

Figure 6:
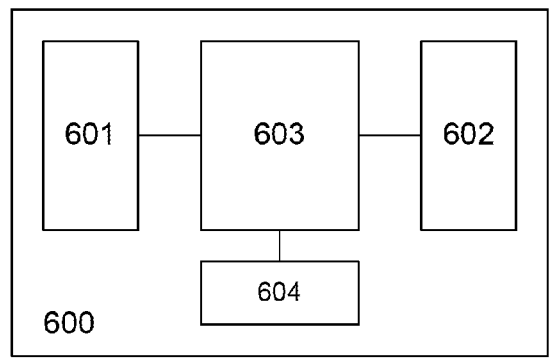
FIG. 6 shows a network node, in accordance with an embodiment of the invention.

In the following, an embodiment of second aspect of the invention is described with reference to FIG. 6. An embodiment of the network node may, e.g., be proxy, a node of the RAN, or a node of a communications network involved in routing the sessions from one or more servers to the RAN.

Network node 600 comprises a first network interface 601 for transmitting data to, and receiving data from, a RAN, such as RAN 102 illustrated in FIGS. 1 and 2, and a second network interface 602 for transmitting data to, and receiving data from, one or more servers, such as servers 121-123 illustrated in FIGS. 1 and 2. Network interfaces 601 and 602 may be combined into a single network interface. As is described with reference to FIGS. 1 and 2, an embodiment of the network node is deployed such that sessions conveyed between a client of the RAN and the one or more servers are routed via the network node.

Network node 600 further comprises a processing unit 603 arranged for synchronizing simultaneous sessions which are established between a client of the RAN and one or more servers, similar to what is described hereinbefore. To this end, network node 600 is arranged for receiving data related to one or more of a plurality of simultaneous sessions established by the client via second network interface 602. Processing unit 603 is arranged for identifying a streaming session among the plurality of multiple simultaneous sessions, reshaping the streaming session into a sequence of bursts and silent periods, identifying at least one non-time-critical session among the plurality of simultaneous sessions, and reshaping the one or more non-time-critical sessions so as to align the bursts, or silent periods, or both, with bursts, silent periods, or both, respectively, of the streaming session. First network interface 601 is arranged for transmitting the sequences of bursts and silent periods to the RAN. Network node 600 may further comprise a local storage 604 for storing information pertaining to the time-criticalness of sessions or of services provided by servers.

In the following, embodiments of the invention utilizing an indication pertaining to the time-criticalness of a session received by a client of the RAN are described with reference to FIGS. 7 to 9.

Figure 7:
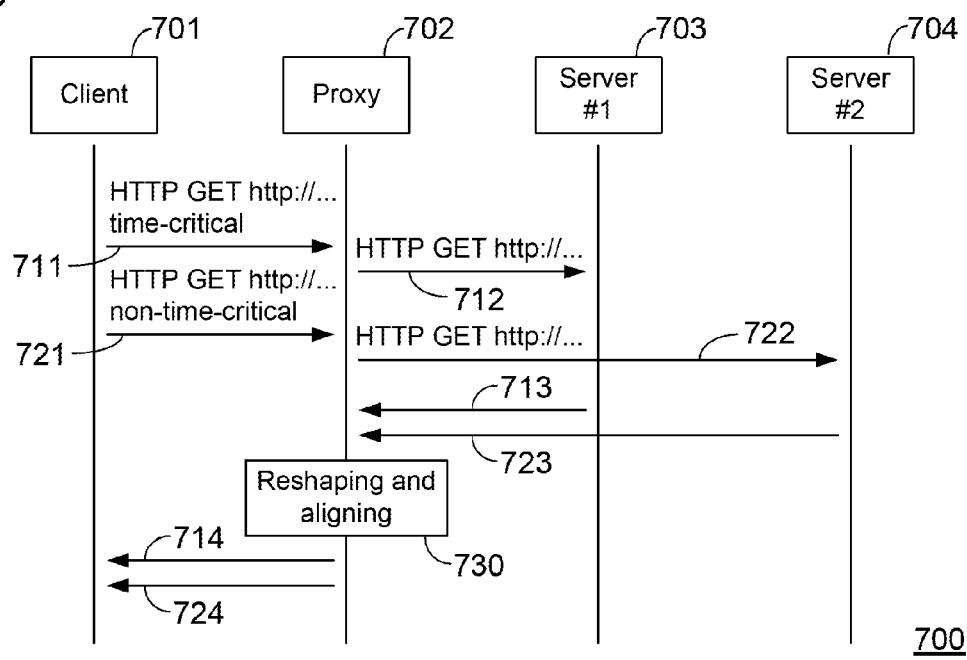
FIG. 7 illustrates signaling of an indication pertaining to the time-criticalness of a session, in accordance with an embodiment of the invention.

In FIG. 7 a sequence diagram 700 is shown, illustrating the process of requesting data, by a client 701, from a first server 703 and a second server 704. Client 701 transmits a first request 711 to server 703 and a second request 721 to server 704. Requests 711 and 721 are intercepted by a network node in accordance with an embodiment of the invention, here illustrated as a proxy 702, such as proxy 103 shown in FIG. 1. Requests 711 and 712 may, e.g., be HTTP GET requests which comprise an additional information element in their respective header. The additional information element indicates the time-criticalness of a session to which requests 711 and 721 relate. For instance, if request 711 relates to a streaming session, e.g., requesting 711 the next media segment from a media server 703, the additional information element may indicate that this request relates to a 'time-critical' session. Correspondingly, request 721, which is assumed to relate to a non-time-critical session, comprises an additional information element indicating that the request relates to a 'non-time-critical' session. Proxy 702 may store this additional information for later usage, e.g., in a local storage of proxy 702, such as storage 604 shown in FIG. 6. Subsequently, proxy 702 forwards requests 711 and 721 servers 703 and 704, respectively. In requests 712 and 722 the additional information element may be omitted.

Subsequently, in response to receiving responses 713 and 723 from servers 703 and 704, respectively, proxy 702, being of aware of the time-criticalness of the respective sessions to which responses 713 and 723 relate, reshapes 730 received data into sequences of bursts and silent periods and 730 synchronizes the sessions with each other, as is described hereinbefore. In the present scenario, the bursts and/or silent periods of response 723, relating to a non-time-critical session, are aligned in time with bursts and/or silent periods of response 713 relating to the time-critical streaming session. Finally, the reshaped and synchronized sessions are transmitted 714/724 to client 701.

Figure 8:
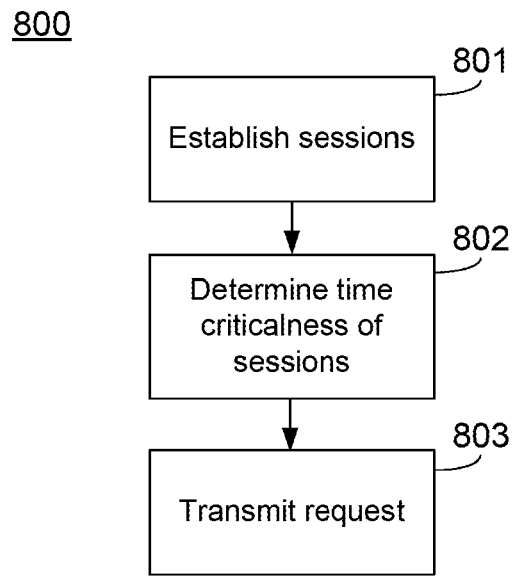
FIG. 8 shows a method of client, in accordance with an embodiment of the invention.

With reference to FIG. 8, a method of a client for receiving a plurality of simultaneous sessions via a RAN in accordance with an embodiment of the invention is described. To this end, it is assumed that a client of a RAN establishes, or has established, multiple simultaneous communication sessions 801 with one or more servers. Then, the client determines a time-criticalness for each of the plurality of simultaneous sessions 802, and transmits a request 803 to a server with which the client has established a session. The request relates to one of the established simultaneous sessions and comprises an indication pertaining to the time-criticalness of the session, e.g., as an additional information element, as is described hereinbefore with reference to FIG. 7. The additional information element may, e.g., indicate whether the session is 'time-critical' or 'non-time-critical'.

As an alternative, a time-criticalness value may be defined, indicating a priority of each session with respect to the session's time-criticalness. For instance, a value of '1' could indicate that the corresponding session is time-critical, whereas a lower value, e.g., '2' or '3', could indicate that the sessions is less time-critical. Such information may be used in synchronizing multiple simultaneous sessions. In particular, such information may be used in determining which session may be used as reference, i.e., with which session the other, less time-critical sessions, should be aligned.

As yet a further alternative, the indication provided by the client may also identify which session of a plurality of simultaneous sessions is associated with an application being in focus. For instance, if a user of a smartphone is watching a video clip, the video player application rendering the video clip will most likely be in focus, and the related streaming session is therefore considered to be time-critical, whereas an email application running in the background may generate traffic which is considered to be non-time-critical. To this end, the indication provided by the client may, e.g., indicate whether the associated application is 'in focus' or not.

Figure 9:
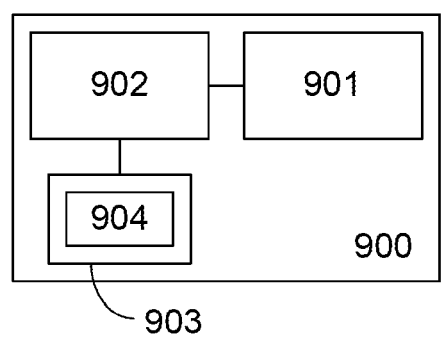
FIG. 9 shows a client, in accordance with an embodiment of the invention.

Finally, a client for receiving a plurality of simultaneous sessions via a RAN, in accordance with an embodiment of the invention, is illustrated in FIG. 9.

Client 900 may, e.g., be a UE, a smartphone, a mobile phone, a computer, a tablet, a media player, or any other device being capable of effecting communications via a RAN. Client 900 comprises a communication unit 901 being arranged for effecting wireless communications with a RAN, a processing unit 902, and a local storage, such as a memory 903. Processing unit 902 is arranged for executing a computer program 904 stored in memory 903. Computer program 904 comprises computer program code which is adapted, when executed in processing unit 902, to implement an embodiment of the method according to the third aspect of the invention. In this way, an existing UE, a smartphone, a mobile phone, a computer, a tablet, a media player, or the like, may be adapted to perform in accordance with an embodiment of the invention. This may, e.g., be achieved by upgrading the software, or firmware, of such a device with an embodiment of the computer program 904.

An embodiment of the computer program 904 may be provided as a computer program product comprising a computer readable storage medium. The computer readable storage medium has the computer program embodied therein. The computer readable storage medium may, e.g., be memory 903, a memory stick, or any other type of data carrier. It will also be appreciated that computer program 904 may be provided to client 900 by means of downloading the computer program over a communication network, i.e., via a RAN.

The person skilled in the art realizes that the present invention by no means is limited to the embodiments described above. On the contrary, many modifications and variations are possible within the scope of the appended claims.

The invention claimed is:

1. A method at a network node for delivering a plurality of simultaneous sessions to a client via a Radio Access Network (RAN), the method comprising:
   identifying a streaming session among the plurality of simultaneous sessions;
   reshaping the streaming session into a sequence of bursts and silent periods;
   identifying at least one non-time-critical session among the plurality of simultaneous sessions;
   reshaping the at least one non-time-critical session into respective sequences of bursts and silent periods such that bursts, or silent periods, or both, of the at least one non-time-critical session are aligned with bursts, silent periods, or both, respectively, of the streaming session; and
   transmitting the sequences of bursts and silent periods to the RAN.

2. The method according to claim 1, wherein reshaping the at least one non-time-critical session comprises aligning the onset of silent periods of the at least one non-time-critical session with the onset of silent periods of the streaming session.

3. The method according to claim 1, wherein an indication pertaining to an onset of a common silent period is transmitted to the RAN.

4. The method according to claim 1, wherein the streaming session and the at least one non-time-critical session are identified based on a respective type of traffic carried by the sessions.

5. The method according to claim 1, wherein the streaming session and the at least one non-time-critical session are identified based on a respective address of one or more servers to which requests of the client are sent and/or from which responses to the client are received.

6. The method according to claim 1, wherein the streaming session and the at least one non-time-critical session are identified based on indications received from the client, which indications pertain to the time-criticalness of one or more sessions of the plurality of simultaneous sessions.

7. A network node for delivering a plurality of simultaneous sessions to a client via a Radio Access Network, RAN, the network node comprising:
   a processor configured to:
      identify a streaming session among the plurality of simultaneous sessions;
      reshape the streaming session into a sequence of bursts and silent periods;
      identify at least one non-time-critical session among the plurality of simultaneous sessions;
      reshape the at least one non-time-critical session into respective sequences of bursts and silent periods such that bursts, or silent periods, or both, of the at least one non-time-critical session are aligned with bursts, silent periods, or both, respectively, of the streaming session; and a network interface configured to transmit the sequences of bursts and silent periods to the RAN.

8. The network node according to claim 7, wherein the network node is configured to reshape the at least one non-time-critical session by aligning the onset of silent periods of the at least one non-time-critical session with the onset of silent periods of the streaming session.

9. The network node according to claim 7, wherein the network node is configured to transmit an indication pertaining to an onset of a common silent period to the RAN.

10. The network node according to claim 7, wherein the network node is configured to identify the streaming session and the at least one non-time-critical session based on a respective type of traffic carried by the sessions.

11. The network node according to claim 7, wherein the network node is configured to identify the streaming session and the at least one non-time-critical session based on a respective address of one or more servers to which requests of the client are sent and/or from which responses to the client are received.

12. The network node according to claim 7, wherein the network node is configured to identify the streaming session and the at least one non-time-critical session based on indications received from the client, which indications pertains to the time-criticalness of one or more sessions of the plurality of simultaneous sessions.

* * * * *